April 15, 1958  A. F. MYERS  2,830,466
DIFFERENTIAL MECHANISM

Filed Dec. 12, 1955  5 Sheets-Sheet 1

INVENTOR
Albert F. Myers.
BY Cameron, Kerkam & Sutton
ATTORNEYS

April 15, 1958 A. F. MYERS 2,830,466
DIFFERENTIAL MECHANISM
Filed Dec. 12, 1955 5 Sheets-Sheet 2

INVENTOR
Albert F. Myers.
BY Cameron, Kerkam & Sutton
ATTORNEYS

April 15, 1958     A. F. MYERS     2,830,466
DIFFERENTIAL MECHANISM
Filed Dec. 12, 1955     5 Sheets-Sheet 4

INVENTOR
Albert F. Myers.
BY Cameron, Kerkam & Sutton
ATTORNEYS

April 15, 1958 A. F. MYERS 2,830,466
DIFFERENTIAL MECHANISM
Filed Dec. 12, 1955 5 Sheets-Sheet 5

INVENTOR
Albert F. Myers.
BY Cameron, Kerkam & Sutton
ATTORNEYS

United States Patent Office 2,830,466
Patented Apr. 15, 1958

2,830,466
DIFFERENTIAL MECHANISM

Albert F. Myers, Berkley, Mich., assignor to Patent Developers, Inc., Detroit, Mich., a corporation of Michigan Application December 12, 1955, Serial No. 552,456

15 Claims. (Cl. 74—650)

This invention relates to differential mechanisms for automotive vehicles of the automatic declutching type wherein the driving and driven clutch elements are automatically disengaged upon overrunning or underrunning of the driven member with respect to the driving member and are maintained in disengaged relationship as long as the overrunning or underrunning continues without a reversal of torque, and is particularly directed to the provision of a new and improved differential mechanism of this type for use in the axles of two-wheel tractors and similar heavy duty vehicles.

The differential of the present invention is especially well adapted for use in the axles of governor controlled, diesel powered two-wheel tractors for propelling heavy equipment, such as earth moving scrapers, bottom dump trailers and the like, wherein steering is accomplished by rotating the entire tractor assembly, including the engine and driving axle, as a unit about a pivotal connection between the tractor and the trailing load.

Due to the large tire sizes and hub gear reduction ratios used in tractors of this type, the non-dirigible character of the wheels, and the fact that the tractor may be turned a full 90° with respect to its trailer, an unusually large amount of differential action is required between the two wheels of the tractor axle. Although such vehicles are used primarily for operations off the highway, they also must be capable of smooth performance on level road surfaces. However, when heavy tractor drawn equipment is driven by governor controlled diesel engines on the highway, the connection between the diesel engine and the tractor wheels tends to cycle between driving and coasting conditions, even when the throttle is held steady. It has been found that, when the tractor is equipped with a known type of automatic declutching differential otherwise well suited for use in such vehicles, these torque reversals adversely affect steering to an objectionable degree.

The principal object of the present invention is to provide a differential mechanism of novel construction particularly adapted for use in the axles of tractors of the character described which will insure smooth, dependable steering characteristics by means of controlled delivery of driving torque to the tractor wheels at all times and under all operating conditions, both on and off the highway.

Another object is to provide an improved differential of the automatic declutching type which will permit either wheel of an axle to overrun and to continue overrunning in spite of reversals of the driving torque while insuring against loss of traction, and will also permit either wheel to underrun when the vehicle is coasting forwardly, but will immediately reengage and positively drive the underrunning wheel, permitting the other wheel to overrun, in the event that power is applied.

A further object is to provide a differential of the character described of relatively simple design which is rugged in construction and dependable in operation, and will perform more satisfactorily under the various operating conditions encountered by heavy duty tractors than any of the similar devices heretofore known.

These and other objects will appear more fully upon consideration of the detailed description of the embodiment of the invention which follows. In this connection, although only one specific form of differential mechanism is described and illustrated in the accompanying drawings, it is to be expressly understood that these drawings are for purposes of illustration only and are not to be construed as defining the limits of the invention, for which latter purpose reference should be had to the appended claims.

Referring now to the drawings, wherein like reference characters indicate like parts throughout the several views.

Figure 1:
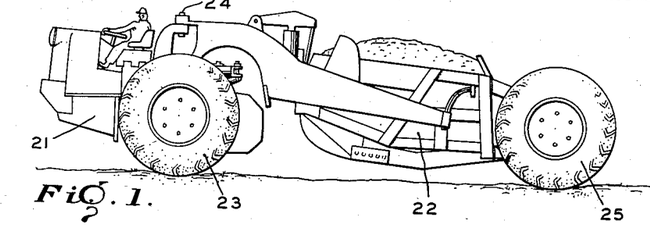
Fig. 1 is a side view of one type of automotive vehicle in which the differential mechanism of the present invention finds particular utility.

There is illustrated in Fig. 1 one type of automative vehicle wherein the differential mechanism of the present invention is particularly useful, this figure representing an earth moving scraper comprising a governor controlled, diesel powered two-wheel tractor 21 and a trailing self-loading scraper 22, the wheels of which also may be diesel engine driven, if desired. In this type of vehicle, the tractor wheels 23 are non-dirigible, steering being accomplished by means of hydraulic rams which rotate the entire tractor assembly, including the engine and the driving axle, about a centrally positioned vertical pivot pin 24. The differential mechanism of the present invention is especially well adapted for use in the axle of tractor wheels 23, and may also be incorporated in the axle of scraper wheels 25 in vehicles wherein a second engine is provided for driving the latter.

Referring now to Figs. 2–16, there is shown therein one embodiment of the invention intended for use in the axle of tractor wheels 23 which will permit either wheel to overrun the other while the engine is driving, as when the vehicle is operating over rough terrain or making turns, and will also permit either wheel to underrun during coasting, while at all times insuring positive transmission of torque to at least one of the wheels. This mechanism is so constructed that, when one wheel overruns or underruns the other, the driven member of the differential connected to the overrunning or underrunning wheel is disengaged or declutched from the driving member and is maintained in disengaged or declutched position as long as the overrunning or underrunning continues and there is no change in the driving or coasting condition of the vehicle, but automatically returns to engaged or clutched position when the overrunning or underrunning ceases, or, in the case of underrunning, when there is a torque reversal from coasting to driving condition.

Figure 2:
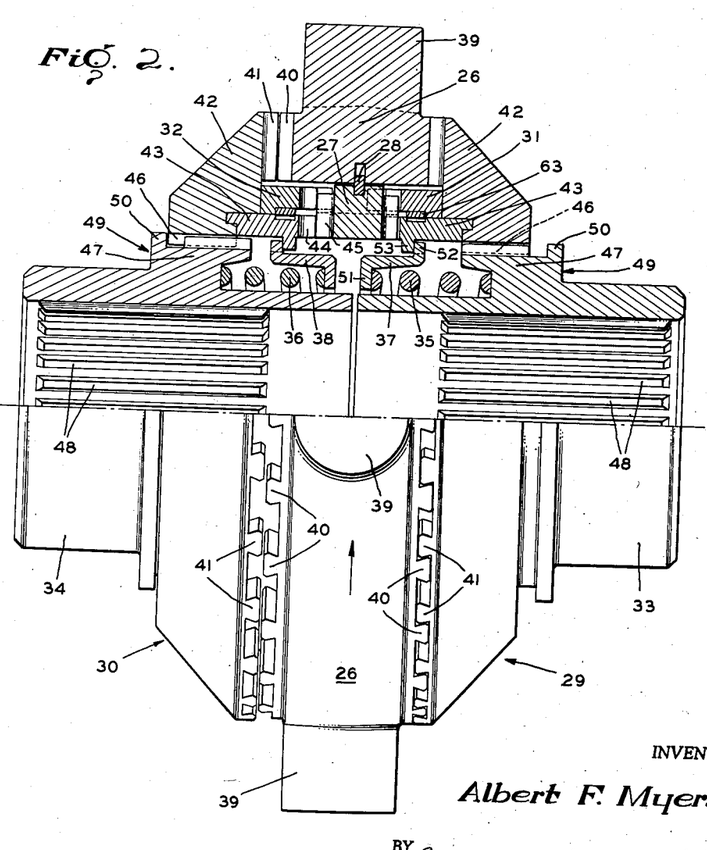
Fig. 2 is a side view, partially in section, of one form of differential embodying the invention which may be used in the driving axle of the vehicle illustrated in Fig. 1, showing the positions of the parts when the left-hand driven member overruns and becomes declutched from the driving member while the vehicle is being driven forwardly.
Figures 3, 8, 9, 10:
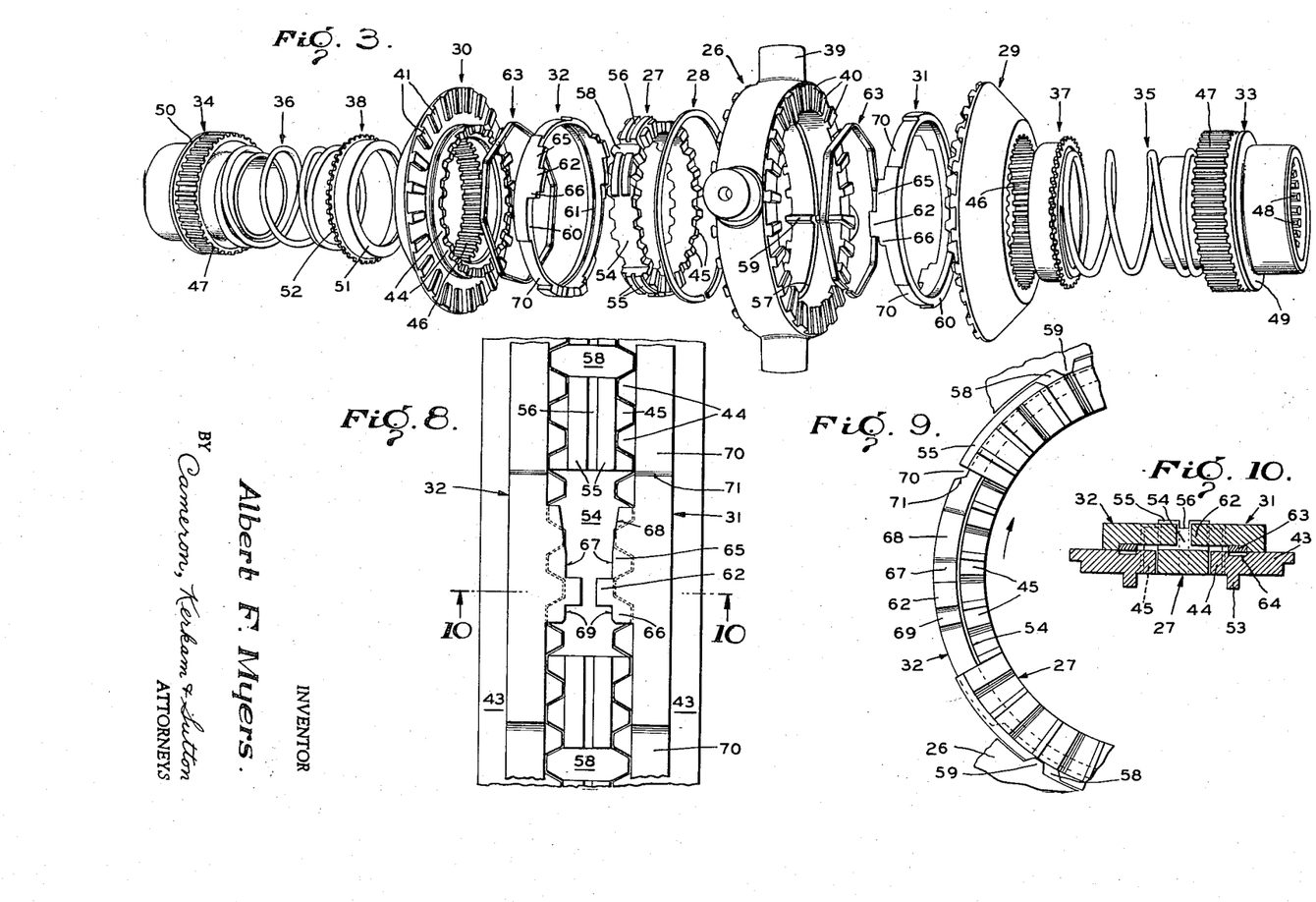
Fig. 3 is a perspective exploded view of the differential of Fig. 2 showing the various parts thereof separated from one another.
Fig. 8 is a fragmentary developed edge view of the holdout rings and cam elements of the differential of Figs. 2 and 3 showing the relative positions of the parts during a forwardly driving condition when both driven members are fully engaged with the driving member.
Fig. 9 is a fragmentary side view corresponding to Fig. 8, looking from the right in the latter figure with the right-hand holdout ring and driven cam element removed, and also showing the relative positions of the driving member keys and the associated slots in the outer surfaces of the center cam member and left-hand holdout ring.
Fig. 10 is a sectional view taken substantially on line 10—10 in Fig. 8.

As shown best in Figs. 2 and 3, the differential mechanism comprises as its principal elements an annular center driving clutch member or spider 26, a center cam member 27 rotatably mounted within center driving member 26 by means of a snap ring 28, a pair of driven clutch and cam members 29 and 30 located on opposite sides of the center driving and cam members, a pair of holdout rings 31 and 32 mounted on driven clutch and cam members 29 and 30, respectively, and also cooperating with center cam member 27, a pair of side sleeve members 33 and 34 which serve as driving connections between the driven clutch and cam members and the half-axle shafts (not shown) of tractor wheels 23, and a pair of compression springs 35 and 36 and associated spring retainers 37 and 38 which are so arranged as to yieldably urge the clutch and cam elements of the mechanism into engagement with one another.

The center driving member 26 is provided with a plurality of radially extending trunnions 39 adapted to fix the driving member within a differential casing of any suitable construction (not shown) which is mounted in the axle and driven from the engine in conventional manner.

The driving member 26 is also provided on each of its side faces with a set of driving clutch teeth 40, preferably slightly undercut, which are adapted to engage similar driven clutch teeth 41 formed on the opposing side faces of the driven clutch and cam members 29 and 30. As indicated in the lower portion of Fig. 2, the spaces between adjacent clutch teeth of each set are wider than the teeth themselves so as to provide a suitable amount of backlash during torque reversals, which also facilitates disengagement of the clutch teeth when one of the driven members is moved axially outwardly away from the driving member by operation of the cam members when the associated wheel attempts to rotate at a different velocity than the driving member 26.

In the embodiment illustrated, each of the driven members 29 and 30 consists of two parts separately formed but permanently welded together to form a unitary annular assembly, the main or clutch part 42 carrying the driven clutch teeth 41 and being recessed at its inner periphery to receive the other part which is in the form of a cam ring 43. The cam ring 43 extends axially inwardly toward the plane of driving clutch teeth 40 and is provided on its inner edge with a plurality of cam teeth 44 adapted to cooperate with similar cam teeth 45 formed on the side faces of center cam member 27.

In order to enable outward axial movement of driven members 29 and 30 relative to center driving member 26 to effect disengagement of the clutch teeth 40 and 41 when overrunning or underrunning occurs, the clutch parts 42 of the driven members are internally splined as indicated at 46 and slidably mounted on externally splined portions 47 of side sleeve members 33 and 34. The sleeve members, which are also internally splined as indicated at 48 to receive the splined inner ends of the half-axle shafts of tractor wheels 23, are adapted to be rotatably supported in the differential casing (not shown), but to be immobilized against outward axial movement by abutment of radially extending shoulders 49 against cooperating portions of the casing, in substantially the same manner as the sleeve members of my Patent No. 2,667,087, dated July 26, 1954. As shown in Fig. 2, the internally splined portions 46 of the driven members are shorter in an axial direction than the externally splined portions 47 of sleeve members 33 and 34 on which they are mounted, and the sleeve members are provided with radially extending flanges 50 which limit the outward axial movement of the driven members relative to the driving member 26. The clearance between the outer radial surfaces of the driven members and the flanges 50 when the driving and driven clutch teeth are fully engaged is sufficient to enable full disengagement of said teeth upon outward axial movement of the driven members.

The springs 35 and 36, which are adapted to normally maintain the clutch and cam teeth of the driven members in engagement with the corresponding teeth of the driving member and center cam member, but which yield upon overrunning or underrunning to permit disengagement of said teeth, surround the inner ends of sleeve members 33 and 34, the outer ends of the springs abutting the externally splined portions 47 of said members and their inner ends thrusting against radially inwardly directed flanges 51 formed on spring retainers 37 and 38. The spring retainers are also provided with radially outwardly extending flanges 52 which engage inwardly projecting collars 53 formed integrally with cam rings 43, the flanges 52 being notched or splined correspondingly to splines 46 of the driven members to facilitate assembly of the mechanism.

The center cam member 27, which cooperates with the cam rings 43 of driven members 29 and 30 to produce disengagement of the driving and driven clutch teeth 40 and 41 at one side of the differential when the corresponding one of tractor wheels 23 overruns or underruns driving member 26, is only about half as wide in an axial direction as the driving member and has an outer peripheral surface of irregular form, the maximum diameter of which is slightly less than that of the inner surface of the driving member. As shown best in Figs. 6 and 7, the radially outer portion of the center cam is so machined as to form a plurality of slots 54 (three in number in the embodiment illustrated) extending the full axial width of the cam member and uniformly spaced circumferentially thereof, while the arcuate sections of said member intermediate the slots are provided with a pair of parallel, radially outwardly extending ridges 55 defining between them a circumferentially extending groove 56 adapted to receive the split snap ring 28 which also engages a groove 57 formed in the inner surface of the driving member 26.

Figure 6:
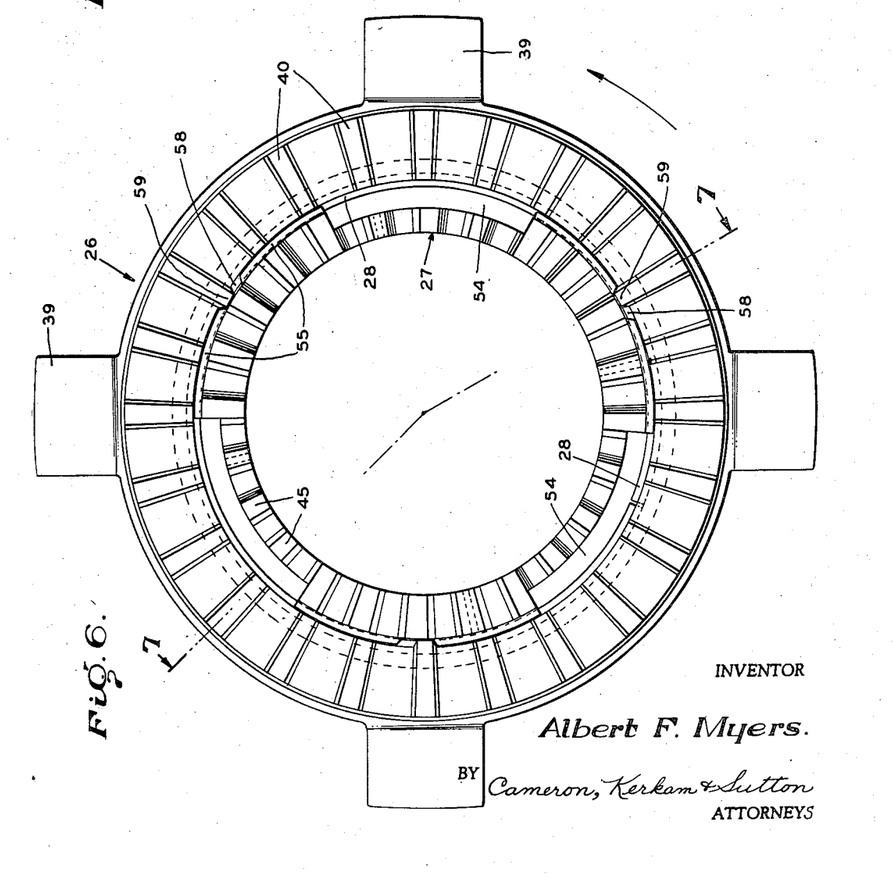
Fig. 6 is a face view of the assembled driving member and center cam member of the differential of Figs. 2 and 3.
Figure 7:
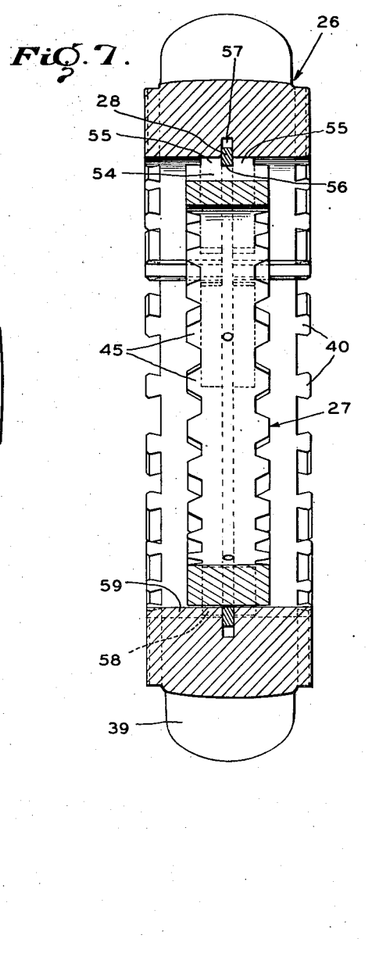
Fig. 7 is a sectional view taken substantially on the line 7—7 in Fig. 6.

Each arcuate section of ridges 55 is provided with a centrally positioned notch or slot 58 into which projects a key 59 extending radially inwardly from the inner surface of driving member 26. Each key 59 is coplanar with a pair of driving clutch teeth 40 located at opposite sides of the driving member, and the circumferential extent of the cooperating slot 58 is equal to that of the key 59 plus a distance equivalent to the angular amount of backlash between the driving and driven clutch teeth 40 and 41 when fully engaged. With this construction, the center cam is prevented from axial movement relative to the driving member by engagement of snap ring 28 in grooves 56 and 57, and is normally rotated with the driving member through the engagement between keys 59 and one end of each slot 58, as indicated in Fig. 6 wherein the arrow represents the normal direction of rotation of the driving member when the vehicle is moving forwardly. The clearance between keys 59 and the other ends of slots 58 enables a relative rotational movement of limited extent between the driving member and center cam member when torque reversals take place.

Assuming that both driven members 29 and 30 are fully engaged with the center driving member 26 and cam member 27, and that the differential mechanism is installed in the axle of tractor wheels 23 of Fig. 1, overrunning of either wheel with respect to the other while the vehicle is driving forwardly or rearwardly will automatically produce disengagement of the driving and driven clutch teeth at that side of the differential corresponding to the overrunning wheel, due to the outward axial movement of the associated driven clutch member produced by the cam teeth 44 and 45 when said member begins to rotate at a greater speed than the driving member.

For example, should the tractor 21 be turned about its pivotal connection 24 to scraper 22 so as to make a right turn while the vehicle is moving forwardly and driving torque is being transmitted from the tractor engine to center driving member 26, the left-hand tractor wheel 23 at the outside of the turn will rotate faster than, or overrun, the right-hand wheel and the increased speed of rotation of the left-hand wheel will be reflected in a corresponding increase in velocity of the associated half-axle shaft, sleeve member 34 and driven member 30 relative to driving member 26. As the driven member 30 rotates ahead of the driving member, a movement made possible by the clearance between the driving and driven clutch teeth shown in the lower portion of Fig. 2, the cam teeth 44 on cam ring 43 of driven member 30 begin to ride up on the inclined sides of cooperating cam teeth 45 on the left-hand side of center cam member 27, the latter member being prevented from partaking of the increased speed of rotation of driven member 30 because the cam teeth on the right-hand side of cam member 27 remain fully engaged with the cooperating cam teeth on driven member 29 which continues to be positively driven by driving member 26 at the same speed as the latter. As the cam teeth of driven member 30 ride up on the teeth of the center cam member, said driven member is moved axially outwardly against the force of spring 36, sliding on the splined portion 47 of its associated sleeve member 34, until said cam teeth are fully disengaged and are riding in end-to-end relationship, at which time the left-hand set of driving and driven clutch teeth 40 and 41 are also completely disengaged and in end-to-end relationship, as shown in Fig. 2.

Disengagement of the left-hand driven member 30 will be effected in the same manner as that above described in the event that the tractor 21 is turned to the right while it is driving rearwardly. If, however, the vehicle is coasting either forwardly or rearwardly when a right turn is made, the right-hand tractor wheel rotates slower than, or underruns, the driving member, and right-hand driven member 29 becomes disengaged from the driving member by the action of the cam teeth in the same manner as that described with respect to an overrunning of the left-hand wheel.

Were it not for the presence of holdout rings 31 and 32, the construction and operation of which are next to be described, continued overrunning or underrunning of either wheel would result in repeated engagement and disengagement of the clutch and cam teeth of the associated driven member with those of the driving and center cam members with the consequent disadvantages inherent in this type of operation, such as increased wear of the cam and clutch teeth, spring fatigue and noise. However, by incorporation in the differential of hold-out rings of new and simple construction, the driven member on the overrunning or underrunning side of the mechanism may be maintained in completely disengaged position as long as the overrunning or underrunning continues, and will be automatically returned to fully engaged position as soon as the overrunning or underrunning ceases, provided no torque reversal takes place in the interim. In the event of a reversal of driving torque while one side of the differential is disengaged, the holdout rings function in a novel manner which insures against loss of traction under all conditions except when the vehicle is coasting rearwardly at the time the turn begins. In the latter case, which is seldom encountered in practice, a torque reversal results in the application of power to one driven member and underrunning of the other, a condition wherein slippage of the driven wheel may produce complete loss of power to the underrunning wheel.

Figure 4:
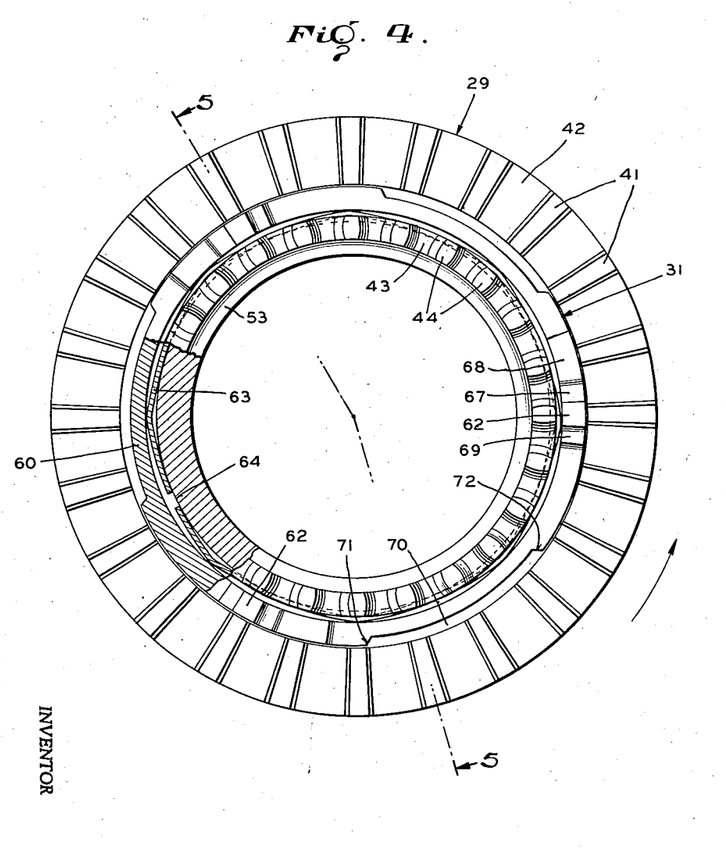
Fig. 4 is a face view, partially in section, of one of the driven clutch and cam assemblies and the associated holdout ring of the differential of Figs. 2 and 3.
Figure 5:
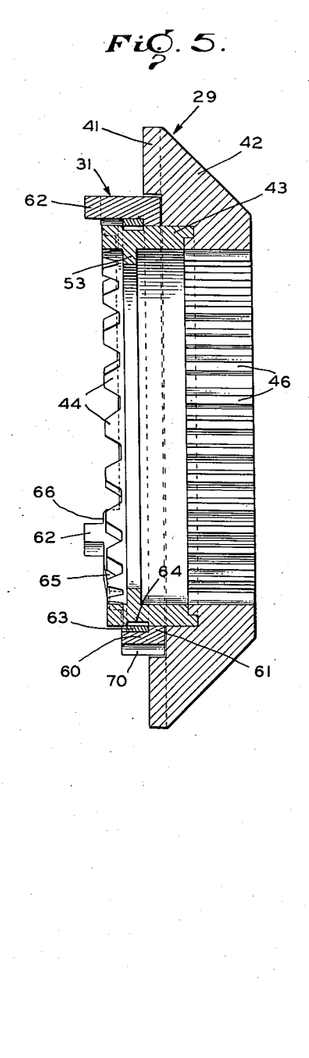
Fig. 5 is a sectional view taken substantially on the line 5—5 of Fig. 4.

In the illustrated embodiment of the invention, the holdout rings 31 and 32 are of the form most readily understood from their showing in Fig. 3, and are mounted on the driven clutch and cam members in the manner indicated best in Figs. 4 and 5. As shown, each ring comprises a circumferentially solid band 60 having at one edge a radially inwardly projecting flange 61 adapted to have a sliding fit on the outer peripheral surface of the cam ring portion 43 of the associated driven member, and at its opposite edge a plurality of circumferentially spaced, axially extending stepped lugs 62 adapted to cooperate with the center cam member in the manner hereinafter described for the purpose of maintaining the driven member on the overrunning or underrunning side of the differential in declutched or disengaged position.

Each holdout ring is connected to the associated driven member by a friction spring 63 consisting of a flat strip of spring steel bent into polygonal form, said spring being interposed between the inner surface of the band 60 of the holdout ring adjacent the flange 61 and the outer surface of cam ring 43, with the corners or vertices of the spring contacting the holdout ring and the central portions of its straight sides contacting the cam ring. In order to prevent axial displacement of the holdout ring relative to the driven member, the outer surface of cam ring 43 is provided with a circumferential groove 64 of substantially the same width as spring 63 in which the central portions of the straight sides of the spring lie when the mechanism is assembled. With this construction, abutment of one edge of the spring against flange 61 and of the opposite edge against the opposing wall of groove 64 locks the holdout ring against axial movement with respect to the cam ring, while at the same time the holdout ring is capable of rotation relative to the cam member against the frictional resistance created by the areas of contact between the spring and the two rings.

The stepped lugs 62 of the holdout ring, of which there are three in the construction illustrated, are unsymmetrical in form, each having a relatively long step 65 forward of the central tongue portion of the lug which extends axially inwardly beyond the teeth 44 of cam ring 43, and a relatively short step 66 on the rearward side of the central tongue. In this connection, it will be understood that the terms "forward" and "rearward" as used herein have reference to the directions in which center driving member 26 rotates when the vehicle is moving forwardly and rearwardly, respectively.

Figure 11:
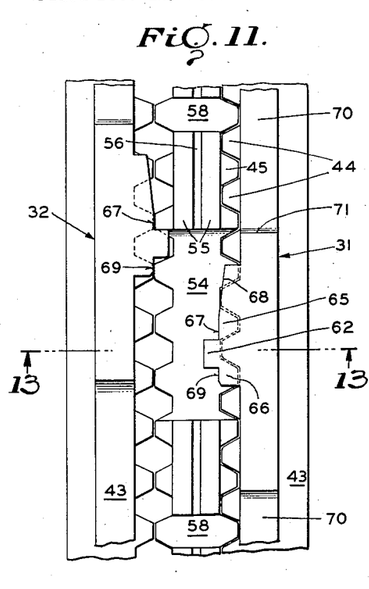
Figs. 11, 12 and 13 are views similar to Figs. 8, 9 and 10, respectively, but showing the relative positions of the parts when the wheel connected to the left-hand driven member is overrunning the driving member during a forwardly driving condition, as in Fig. 2.
Figure 14:
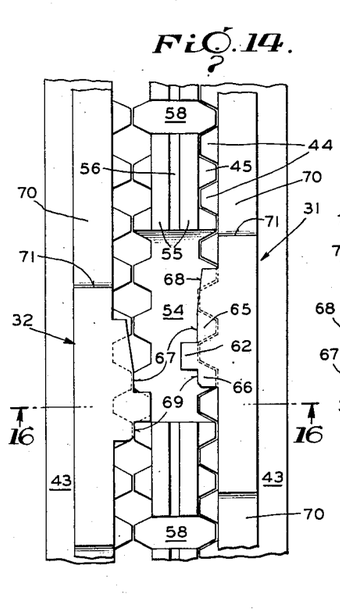
Figs. 14, 15 and 16 are views similar to Figs. 8, 9 and 10, respectively, but showing the relative positions of the parts when the wheel connected to the left-hand driven member is underrunning the driving member during a forwardly coasting condition.

As indicated in Figs. 8, 11 and 14, the surface of each forward step 65 which is generally perpendicular to the axis of the differential, consists of a flat land 67 immediately adjacent the central tongue portion of the lug, and a forwardly extending ramp or angularly inclined surface 68. Each rear step 66 is substantially rectangular in form, having a flat land 69 the circumferential extent of which is slightly less than the angular amount of clearance or backlash between the clutch teeth 40 and 41 of the driving and driven members when the latter are fully engaged. The flat lands 67 and 69 of lugs 62 all lie in a plane which is parallel to, but preferably slightly closer to the central plane of the differential than, that of the ends or tops of cam teeth 44; i. e., the lands 67 and 69 are preferably slightly higher than cam teeth 44. The forward ends of ramps 68, however, lie in a plane which is somewhat further away from the central plane of the differential than the ends of the cam teeth. The rear corners of rear steps 66 are also beveled down to points slightly beyond the plane of the ends of cam teeth 44. As will be apparent from the subsequent description, this difference in height between the flat land surfaces of the lug steps and the ends or tops of the cam teeth provides a small axial clearance between the cam and clutch teeth when disengaged, and thus avoids the wear and noise that would result were said teeth to have end-to-end contact with one another during overrunning or underrunning.

Referring now particularly to Figs. 4–7, 10, 13, and 16, all of which are drawn to substantially the same scale, it will be seen that the toothed portions of center cam member 27 intermediate slots 54 have a radial thickness only slightly less than the combined radial thickness of a holdout ring and the toothed portion of the cam ring of the driven member on which the holdout ring is mounted, so that the radially inner portion of the center cam cooperates with the driven cam rings while the radially outer portion thereof cooperates with the holdout rings.

The radially inner portion of center cam member 27 is solid, and the cam teeth 45 on the opposite sides thereof are equal in number and corresponding in form to the cam teeth 44 of the driven members. However, as previously described, the radially outer portion of the center cam is so machined as to form a plurality of slots 54 extending the full axial width of the cam member, said slots being equal in number to the stepped lugs 62 of the holdout rings and so cut that the end walls of each slot are substantially coincident with the outer corners of two of cam teeth 45.

In the construction illustrated, wherein there are twenty-four equally spaced cam teeth on each side of the center cam member, each slot 54 has an arcuate extent of approximately 56°, equivalent to about three and one-half cam teeth. Inasmuch as the circumferential extent of each of the stepped lugs, measured between the front edge of the forward step and the rear edge of the rear step, is approximately equal to that of two cam teeth, there is sufficient clearance between the lugs and the end walls of the slots to prevent the possibility of a "by-pass," i. e., a failure of the clutch teeth to reengage, when the center driving member is overtaking an overrunning driven member while the vehicle is moving rearwardly. The axial length of the tongue portions of stepped lugs 62 is slightly less than the distance from the plane of the ends of one set of center cam teeth 45 to the adjacent side of the snap ring groove 56 so that, when the lugs occupy their axially innermost positions in the center cam slots 54, there is a slight clearance between the inner ends of the lugs and the sides of snap ring 28.

In the form of center cam member shown in the drawings, the cam teeth 45 extend the full radial thickness of the cam ring in those portions thereof intermediate the slots 54. Inasmuch as the radially outer portions of these teeth perform no useful purpose, there being no corresponding cam teeth on the holdout rings, it is obvious that the side faces of the center cam member may be made smooth outwardly of the circumferential plane of the bottoms of slots 54, if desired. However, it has been found simpler and more economical from a machining standpoint to cut the cam teeth in the manner illustrated.

In addition to the stepped lugs 62, each of holdout rings 31 and 32 is also provided with a plurality of elongated slots 70 in the outer peripheral surface of band portion 60 which are located circumferentially between the stepped lugs and receive the keys 59 of driving member 26.

The slots 70 are so positioned relative to stepped lugs 62 and are of such circumferential extent that, when either driven member is disengaged from the driving member due to overrunning of the associated tractor wheel and the holdout ring on the disengaged side is in the position illustrated at the left-hand side of Fig. 11, i. e., with the lands 67 of forward steps 65 in contact with the tops of cam teeth 45 at the forward ends of center cam slots 54 and the front sides of the tongue portions of lugs 62 abutting the forward walls of said slots, the rear end 71 of each slot 70 is spaced rearwardly of the cooperating key 59 a distance sufficient to clear the key whether the driving member 26 be in driving position or in coasting position. This relationship of the parts permits the overrunning driven member to remain disengaged as long as the overrunning continues even though reversals of torque may occur due to a change from driving to coasting, or vice versa.

The holdout ring slots 70 are also so designed that, when either driven member underruns the driving member when the latter is in a coasting position and the associated holdout ring has moved to the position indicated at the left-hand side of Fig. 14, i. e., with the lands 69 of rear steps 66 in contact with the tops of cam teeth 45 at the rear ends of slots 54 and the rear sides of the tongue portions of lugs 62 abutting the rear walls of said slots, the front end 72 of each slot 70 is in contact with the cooperating driving member key 59, which is also in contact with the rear end of one of slots 58 in the periphery of center cam member 27. With this relationship of the parts, a torque reversal of the driving member from coasting to driving position, which causes the driving member to move forwardly relative to the engaged driven member and center cam a distance equivalent to the angular clearance or backlash between the driving and driven clutch teeth, will also result in a forward rotational movement by the driving member keys 59 of the holdout ring on the disengaged side of the differential sufficient to disengage the lands 69 of rear steps 66 from the tops of the cam teeth at the rear ends of center cam slots 54 and thereby permit reengagement of the underrunning driven clutch member.

It will be apparent from the foregoing description and the drawings that the arcuate extent of each holdout ring slot 70 is slightly greater than the maximum amount of rotational movement of the holdout rings relative to the center cam permitted by slots 54 and lugs 62; i. e., each slot 70 has an arcuate extent slightly greater than that of each slot 54 less the arc subtended by the central tongue portion of the cooperating lug 62. It is also evident that each slot 70 is of greater circumferential extent than the overall circumferential length of each lug 62. In the illustrated embodiment of the invention, each slot 70 subtends an arc of approximately 50°, and is so positioned that its rear end 71 is located approximately 27° forwardly of the front side of the tongue portion of the adjacent lug 62 while its front end 72 lies approximately 34° to the rear of the rear side of the tongue of the next lug.

The method of operation of the differential mechanism of the present invention will appear most readily from a consideration of Figs. 8–16 of which Figs. 8–10 illustrate the relative positions of the holdout rings, the cam rings of the driven members and the center cam member when both driven members are fully engaged with the driving member, while Figs. 11–13 and 14–16 indicate the relative positions of the same parts when the left-hand side of the differential is overrunning and underrunning, respectively.

As illustrated in Figs. 8–10, it is assumed that the vehicle is driving forwardly, rather than coasting, so that the keys 59 of driving member 26 are in abutment with the forward ends of slots 58 in the periphery of center cam member 27. If the vehicle were coasting forwardly, the parts would occupy the same relative positions as those shown except that the keys 59 would be shifted rearwardly through a distance equivalent to the clearance or backlash between the driving and driven clutch teeth and be in abutment with the rear ends of slots 58. Under these conditions, i. e., when the vehicle is either driving or coasting forwardly with both driven members fully engaged with the driving member, the driving member keys 59 are positioned intermediate the ends of holdout ring slots 70.

In the fully engaged condition of Figs. 8–10, the cam teeth 44 of both driven members are fully meshed with the teeth 45 of center cam member 27 and the stepped lugs 62 of the holdout rings project their maximum distance into, and are positioned substantially centrally within, slots 54 in the center cam. Since at this time there is no force exerted on the holdout rings, other than inertia, tending to produce relative rotation between them and their respective driven members, the holdout rings rotate with the driven members due to the friction clutch effect of springs 63 and float, so to speak, in the slots 54.

If, however, the left-hand side of the differential begins to overrun and driven member 30 rotates at a greater velocity than center driving member 26, the cam teeth 44 which are integral with said driven member ride up on the left-hand set of teeth 45 on the center cam and cause the overrunning driven member to move axially outwardly and disengage the left-hand set of clutch teeth 40 and 41. During the time that cam teeth 44 are riding up the inclined sides of center cam teeth 45 and during the initial period of the ensuing end-to-end sliding contact of said teeth, holdout ring 32 on the overrunning driven member 30 continues to move with the latter forwardly with respect to the center cam member due to the frictional connection between the two elements established by spring 63. As this forward movement continues, the ramps or inclined surfaces 68 of forward steps 65 of holdout ring lugs 62 come into contact with and slide over the corners of the front end walls of slots 54 and, spring 63 still being effective to resist relative rotation between the holdout ring and its driven member, move the driven member axially outwardly still further so as to completely separate the clutch and cam teeth of the driven member from the corresponding teeth of the driving member and center cam. The forward rotational movement of holdout ring 32 relative to the center cam then continues until the advancing front sides of the central tongue portions of lugs 62 come into abutment with the forward end walls of slots 54, whereupon the holdout ring becomes immobilized with respect to the center cam in the position shown in Figs. 11–13, with the lands 67 of forward steps 65 resting on the tops of the cam teeth 45 at the forward ends of slots 54. Thereafter holdout ring 32 slips frictionally with respect to driven member 30 as long as the latter rotates at a greater velocity than center driving member 26.

Figures 12, 13:
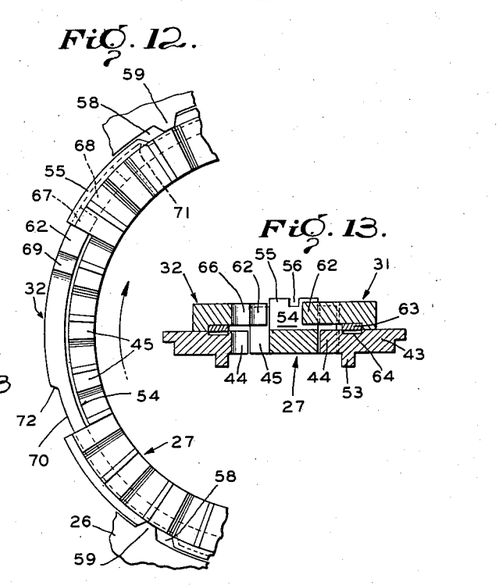

As indicated in Fig. 12, the rear end 71 of each slot 70 in holdout ring 32 is positioned rearwardly of the rear end of the adjacent slot 58 in center cam 27. Consequently, should a torque reversal occur while the left-hand driven member 30 is overrunning and the vehicle is moving forwardly, the consequent backward movement of keys 59 from the forward to the rear ends of slots 58 will not effect any change in position of holdout ring 32 and the overrunning side of the differential will remain disengaged.

When overrunning of the left-hand side of the differential ceases, the speed of rotation of driven member 30 decreases until it reaches and then tends to drop below that of the driving member and the rest of the elements then rotating with the latter, including the center cam. As soon as the speed of driven member 30 becomes less than that of driving member 26, i. e., when the latter begins to move ahead of the former, the friction clutch effect of spring 63 becomes operative to cause holdout ring 32 to move rearwardly with driven member 30 since there is no longer any force opposing such movement other than the frictional contact between the lands 67 of forward steps 65 of the holdout ring and the ends of cam teeth 45 at the forward ends of slots 54. As driven member 30 and holdout ring 32 drop rearwardly relative to the driving member and center cam, the lands 67 first, and then ramps 68, move back off the teeth of the cam ring until the ends of ramps 68 have cleared the corners of the end walls of cam ring slots 54, at which time the driven member is free to return to the fully engaged position of Figs. 8–10 under the influence of spring 36 as soon as its cam teeth 44 come opposite the spaces between the cam teeth 45 of the center cam.

As previously indicated, Figs. 11–13 indicate the method of operation of the differential when the vehicle is being driven forwardly and the left-hand tractor wheel 23 overruns, as would occur during the making of a right turn. Should a left turn be made while driving forwardly, the differential will function in the same manner except that the right-hand side of the differential will overrun instead of the left-hand side.

Let it now be assumed that the vehicle is coasting forwardly when a left turn is begun. Under these conditions, the right-hand driven member 29 cannot overrun the driving member 26 because the forward faces of driven clutch teeth 41 are in abutment with the rear faces of driving clutch teeth 40. Consequently, the right-hand side of the differential is the driving side and the left-hand side underruns with driven member 30 rotating at less velocity than center driving member 26. Cam teeth 44 of driven member 30 then cooperate with the left-hand set of teeth 45 on the center cam and cause the underrunning driven member to move axially outwardly and disengage the left-hand set of clutch teeth in the same manner as that previously described with reference to the overrunning condition of Figs. 8–11, except that holdout ring 32 is moved rearwardly with the underrunning driven member 30 relative to center cam member 27 until lands 69 of rear steps 66 of lugs 62 come into contact with and slide over the ends of cam teeth 45 at the rear ends of slots 54 and the rear sides of the tongue portions of lugs 62 come into abutment with the rear end walls of slots 54, as indicated in Figs. 15–16.

When underrunning of the left-hand side of the differential ceases, the speed of rotation of driven member 30 increases until it reaches and then tends to rise above that of the driving member and the rest of the elements then rotating with the latter, including the center cam. As soon as the speed of driven member 30 becomes more than that of driving member 26, i. e., when the former begins to move ahead of the latter, the friction clutch effect of spring 63 becomes operative to cause holdout ring 32 to move forwardly with driven member 30 relative to the driving member and center cam. As soon as lands 69 of rear steps 66 of lug 62 move forwardly off the tops of cam teeth 45 at the rear ends of slots 54 and clear the corners of the end walls of said slots, driven member 30 is free to return to the fully engaged position of Figs. 8–10 under the influence of spring 36 as soon as its cam teeth 44 come opposite the spaces between the cam teeth 45 of the center cam.

Figures 15, 16:
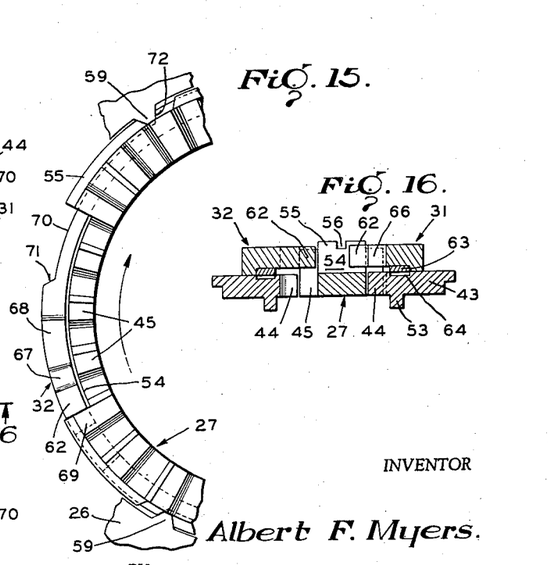

When the left-hand side of the differential is underrunning as the vehicle coasts forwardly in a left turn, each key 59 of the driving member abuts on one side thereof the rear end of the associated slot 58 in the center cam and on the other side the front end of the associated slot 70 in holdout ring 32, as shown in Fig. 15. Should a reversal of torque from coast to drive then occur, keys 59 will move forwardly and carry with them holdout ring 32 a distance equivalent to the clearance or backlash between the clutch teeth. Since the circumferential extent of land 69 of each rear step 66 is, as previously described, slightly less than the angular amount of backlash, this movement will return the holdout ring to a position wherein the lugs 62 may reenter slots 54 and permit reengagement of driven member 30 in the same manner as if said driven member ceased to underrun by increasing its speed of rotation relative to that of the driving member. As soon as the underrunning left-hand driven member has become reengaged due to a torque reversal, and becomes driven by the driving member, continuation of the left turn will cause the right-hand driven member 29 to overrun, whereupon the differential operates in the same manner as that illustrated in Figs. 11–13, except that the right-hand side becomes disengaged, instead of the left-hand side.

If the vehicle is driving rearwardly and goes into a turn, the differential functions in the same manner as when the vehicle is driving forwardly except that a torque reversal results in reengagement and driving of the originally overrunning driven member and in underrunning of the opposite driven member which was originally receiving the driving torque. When the vehicle is coasting rearwardly and goes into a turn, functioning of the differential is the same as when the vehicle is coasting forwardly except that, in the event of a torque reversal during the turn, the originally underrunning side of the differential continues to underrun while driving torque is applied to the other side.

There is thus provided by the present invention an improved differential mechanism of the automatic declutching type which is particularly adapted for employment in the axles of tractors having non-dirigible wheels and other vehicles, such as fork lift trucks, wherein a large amount of differential action is required and unusual steering problems arise.

Although only one specific form of differential embodying the invention has been described and illustrated in the accompanying drawings, it will be obvious that the invention is not limited to the particular structure shown, but is capable of a variety of mechanical embodiments. For example, while the illustrated employment of three keys on the driving member, a corresponding number of slots in the center cam and holdout ring and an equal number of holdout ring lugs provides a well balanced assembly, it is evident that any suitable number of such elements, more or less than three, may be used provided appropriate changes are made in their relative dimensions and angular relationships. It is also possible to eliminate the central tongue portions of the holdout ring lugs, if desired, in which case the flat lands of each lug are continuous and the extent of movement of the holdout rings relative to the center cam member is limited by engagement of the driving member keys and the ends of the circumferentially extending slots in the peripheries of the holdout rings.

Various other changes, which will now suggest themselves to those skilled in the art, may be made in the form, details of construction and arrangement of the parts without departing from the inventive concept. Reference is therefore to be had to the appended claims for a definition of the limits of the invention.

What is claimed is:

1. A differential mechanism of the class described comprising a driving member, a pair of driven members, cooperating clutch elements on said driving and driven members for transmitting torque between said driving member and said driven members, each of said driven members being axially movable relative to said driving member, means including a cam member mounted within said driving member for causing the axial separation of one of said driven members and the driving member and disengagement of the cooperating clutch elements thereof when the velocity of said driven member differs from that of said driving member, said cam member having in the periphery thereof a first slot of relatively short circumferential extent and a second slot of greater circumferential extent than said first slot, a holdout ring rotatably mounted on each of said axially movable driven members adapted to maintain said axial separation so long as the velocity of the associated driven member differs from that of said driving member, each of said holdout rings having an axially projecting lug extending into the second slot of said cam member and cooperating therewith to permit a limited rotational movement of said holdout ring relative to said cam member but immobilizing said ring with respect to said cam member after said limited movement has taken place, whereupon the driven member on which said holdout ring is mounted may rotate relatively to said ring so long as the velocity of said driven member differs from that of the driving member, each of said holdout rings also having a circumferentially extending slot in the periphery thereof circumferentially offset from said lug, and a radially projecting key carried by said driving member and extending into the slots of said holdout rings and the first slot of said cam member.

2. A differential mechanism according to claim 1 wherein the circumferential extent of the slot of each of said holdout rings is slightly greater than the circumferential extent of the second slot of said cam member less the circumferential extent of the portion of the axially projecting lug of said holdout ring which extends into said second slot when the associated driven member is being maintained in axially separated relation to said driving member.

3. A differential mechanism according to claim 1 wherein the axially projecting lug of each of said holdout rings includes stepped portions of equal axial height but unequal circumferential extent, the shorter of said stepped portions having a circumferential extent slightly less than the angular amount of backlash between the cooperating clutch elements of said driving and driven members.

4. A differential mechanism according to claim 1 wherein the axially projecting lug of each of said holdout rings has a central tongue portion and stepped portions on opposite sides of said tongue portion, the overall circumferential extent of said lug being less than the circumferential extent of the second slot of said cam member.

5. A differential mechanism according to claim 4 wherein the stepped portions of each of said lugs are of unequal circumferential extent, the shorter of said stepped portions having a circumferential extent slightly less than the angular amount of backlash between the cooperating clutch elements of said driving and driven members.

6. A differential mechanism according to claim 1 wherein the peripheral slot of each of said holdout rings is so positioned relatively to the axially projecting lug thereof and is of such circumferential extent that, when one of said driven members has been disengaged from the driving member due to overrunning while the driving member is rotating in a direction to transmit forwardly driving torque to the other driven member, the key carried by said driving member is separated from the closest end of said slot by an angular distance in excess of the angular amount of backlash between the cooperating clutch elements of said driving and driven members, whereby, upon a reversal of torque, said key is inoperable to rotate the holdout ring relative to the cam member and effect reengagement of the overrunning driven member with the driving member.

7. A differential mechanism according to claim 1 wherein the peripheral slot of each of said holdout rings is so positioned relatively to the axially projecting lug thereof and is of such circumferential extent that, when one of said driven members has been disengaged from the driving member due to underrunning while the driving member is being driven forwardly by the other driven member, the key carried by said driving member is substantially in contact with one end of said slot, whereby, upon a reversal of torque, said key is operable to rotate the holdout ring relative to the cam member and effect reengagement of the underrunning driven member with the driving member.

8. In a differential mechanism for a pair of opposed driven members of the type embodying two sets of meshing driving and driven clutch elements, the combination of a cam member rotatable but axially immovable with respect to the driving clutch elements and having cam elements operative to disengage either set of driving and driven clutch elements by axial movement in one direction of the driven clutch element relative to the associated driving clutch element when the associated driven member overruns or underruns the driving clutch element, a key carried by said driving clutch elements extending into a slot formed in said cam member to limit the extent of rotation of the latter relative to said driving clutch elements, a holdout ring carried by each of said axially movable driven clutch elements which, upon overrunning or underrunning, initially moves both axially and rotatably with said element relative to the associated driving clutch element and the cam member, an axially projecting stepped lug on each of said rings having surfaces substantially perpendicular to the axis of rotation of said driving member which, during said initial movement, come into contact with cooperating surfaces on said cam member and prevent axial movement of the associated driven clutch element in the direction to effect reengagement with the driving clutch element, means including said stepped lug operable when said surfaces come into contact for preventing further rotational movement of said ring relative to said cam member as long as the overrunning or underrunning continues, and a circumferentially extending slot formed in each of said holdout rings into which said key also extends.

9. A transfer case differential mechanism comprising a driving member having clutch teeth formed on the opposite sides thereof, a pair of axially movable driven members having clutch teeth adapted for engagement with and disengagement from the clutch teeth of said driving member, a cam member rotatably mounted with respect to said driving member, a key fixed to said driving member and extending into a slot formed in said cam member to limit the extent of rotation of the latter relative to said driving member, cam elements on said driven members cooperating with said cam member for disengaging either driven member from said driving member when said driven member rotates at a different velocity than said driving member, a holdout ring mounted on each of said driven members for axial movement therewith and rotation relative thereto, a slot in each of said holdout rings into which said key also extends, stepped projections on said holdout rings extending toward said cam member, slots in said cam member additional to said key receiving slot adapted to receive said projections when the clutch teeth of said driving and driven members are in engagement, surfaces on said cam member adjacent said last named slots which, when engaged by the stepped surfaces of said projections, hold the driven members out of engagement with the driving member, the stepped surfaces of said holdout ring projections being moved into engagement with said cam member surfaces when said driven members overrun or underrun and are disengaged from said driving member, and means for immobilizing said holdout rings with respect to said cam member with the stepped surfaces of said projections in engagement with the surfaces of said cam member as long as the overrunning or underrunning continues.

10. In a differential mechanism of the type embodying a driving member having clutch teeth formed on the opposite sides thereof, a pair of driven members axially movable against spring pressure relative to said driving member and having clutch teeth engageable with those of said driving member, and a cam member rotatably mounted on said driving member cooperating with cam elements carried by said driven members for disengaging either driven member from the driving member when said driven member overruns or underruns the driving member, the combination of a key fixed to said driving member and engaging said cam member to limit the extent of rotation of the latter relative to said driving member, a holdout ring for each of said driven members adapted to maintain the latter in disengaged position as long as the overrunning or underrunning continues, said holdout rings being rotatably mounted on said driven members and having slots into which said driving member key extends, said holdout ring also having axially extending projections receivable in slots in said cam member when the driven members are engaged with the driving member, axially raised surfaces on said cam member adjacent said slots against which said projections abut when either driven member is disengaged from the driving member, and means for preventing rotation of the holdout ring of an overrunning or underrunning driven member relative to said cam member when said projections are in abutment with said axially raised surfaces as long as said driven member overruns or underruns the driving member.

11. For use in a differential mechanism of the type comprising a driving member, a pair of driven members, cooperating clutch elements on said driving and driven members for transmitting torque between said driving member and said driven members, each of said driven members being axially movable relative to said driving member, and means including a cam member mounted within said driving member for causing the axial separation of one of said driven members and the driving member and disengagement of the cooperating clutch elements thereof when the velocity of said driven member differs from that of said driving member, a holdout ring adapted to be rotatably mounted on either of said axially movable driven members for maintaining said axial separation so long as the velocity of the associated driven member differs from that of said driving member comprising a circumferentially continuous band portion, at least one axially projecting stepped lug integral with said band portion, said lug having a central tongue portion and a step on each side of said tongue portion, and at least one circumferentially extending slot formed in the periphery of said band portion at a position circumferentially offset from said lug.

12. A differential mechanism holdout ring according to claim 11 wherein the circumferential extent of said slot is greater than that of said stepped lug.

13. A differential mechanism holdout ring according to claim 11 wherein the steps on said lug are of different circumferential extent, the longer of said steps including a ramp portion having an inclined surface lying in a plane oblique to the axis of said band portion.

14. For use in a differential mechanism of the type comprising a driving member, a pair of driven members, cooperating clutch elements on said driving and driven members for transmitting torque between said driving member and said driven members, each of said driven members being axially movable relative to said driving member, and means including a cam member mounted within said driving member for causing the axial separation of one of said driven members and the driving member and disengagement of the cooperating clutch elements thereof when the velocity of said driven member differs from that of said driving member, a holdout ring adapted to be rotatably mounted on either of said axially movable driven members for maintaining said axial separation so long as the velocity of the associated driven member differs from that of said driving member comprising a circumferentially continuous band portion, a plurality of axially projecting stepped lugs integral with said band portion, and a like plurality of circumferentially extending slots formed in the periphery of said band portion, each of said slots being located circumferentially between the adjacent ends of a pair of lugs.

15. A differential mechanism holdout ring according to claim 14 wherein said stepped lugs are three in number and are uniformly spaced and the said peripheral slots are of like number, each slot having a circumferential extent of approximately 50°, each lug having a central tongue portion and steps on opposite sides of said tongue portion of unequal circumferential extent, and one end of each slot being positioned approximately 27° away from the adjacent side of the central tongue portion of the adjacent lug.

References Cited in the file of this patent

UNITED STATES PATENTS

| | | |
|---|---|---|
| 2,638,794 | Knoblock | May 19, 1953 |
| 2,667,087 | Myers | June 26, 1954 |

U. S. DEPARTMENT OF COMMERCE

PATENT OFFICE

CERTIFICATE OF CORRECTION

Patent No. 2,830,466     Albert F. Myers           April 15, 1958

It is hereby certified that error appears in the printed specificatio: of the above numbered patent requiring correction and that the said Letter Patent should read as corrected below.

Column 2, line 55, before "the parts" strike out "of"; line 63, for "automative" read -- automotive --; column 10, line 36, for "Figs. 15-16" read -- Figs. 14-16 --; column 14, line 7, for "ring" read -- rings --.

Signed and sealed this 17th day of June 1958.

(SEAL)
Attest:
KARL H. AXLINE

Attesting Officer

ROBERT C. WATSON
Commissioner of Patents